Oct. 28, 1958  
J. O. BENSON  
2,858,219  
CEREAL PRODUCT WITH HONEYCOMB-LIKE APPEARANCE  
AND METHOD OF MAKING SAME  
Filed March 19, 1956
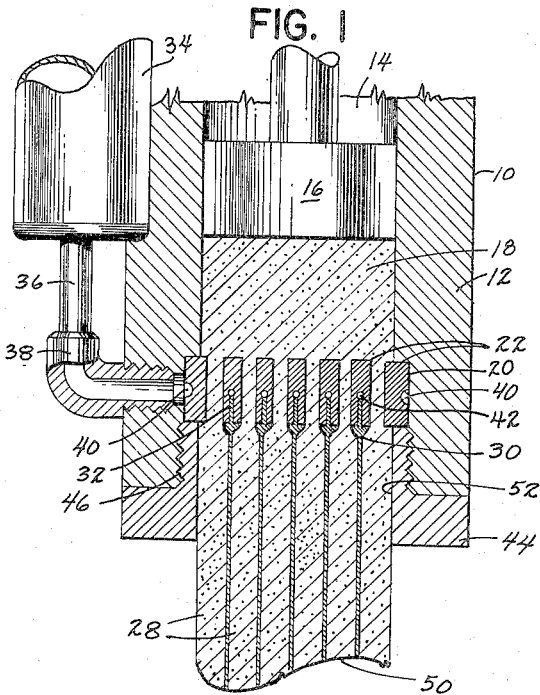
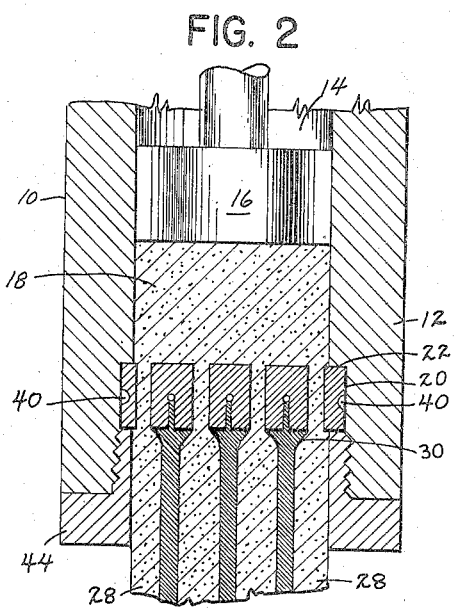
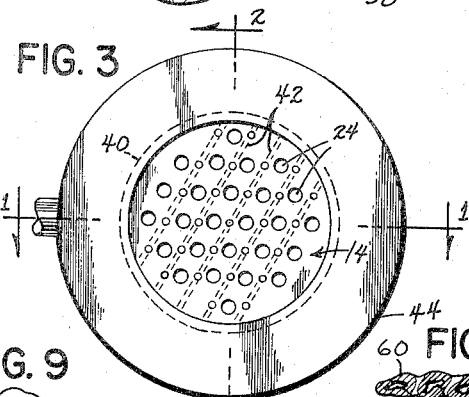
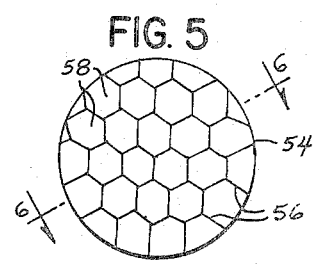
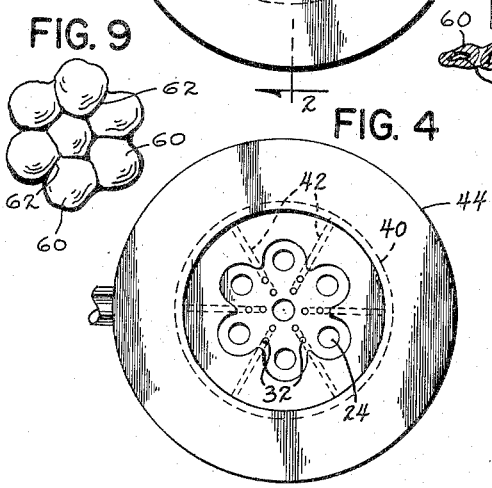
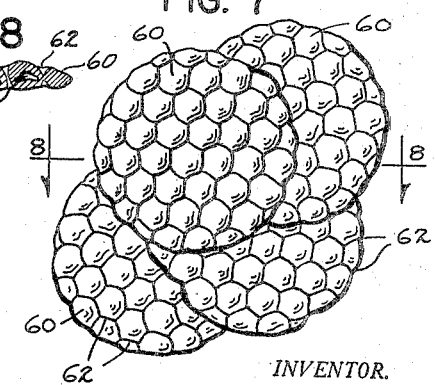
INVENTOR.  
JOHN O. BENSON  
BY  
Stuart R. Peterson  
ATTORNEY

United States Patent Office

2,858,219
Patented Oct. 28, 1958

1

2,858,219

CEREAL PRODUCT WITH HONEYCOMB-LIKE APPEARANCE AND METHOD OF MAKING SAME

John O. Benson, Mayer, Minn., assignor to General Mills, Inc., a corporation of Delaware Application March 19, 1956, Serial No. 572,522

5 Claims. (Cl. 99—83)

This invention relates to a cereal product of the ready-to-eat variety and also relates to a process of producing such cereal product.

The principal object of the instant invention is to produce a cereal flake having a distinctly attractive appearance. In this regard it is an aim of the invention to provide a flake having a multiplicity of bulges or small mounds distributed so that the flake has a honeycomb-like surface and has a contrasting color surrounding each of these swellings in a honeycomb pattern. Further, it is within the purview of the invention to add various flavors in admixture with the color which surrounds the swellings on the flakes.

Another object of the invention, that is a concomitant result of the foregoing object, resides in the provision of a cereal flake that has a texture which has proved to be extremely appetizing, as well as having a pleasing and novel appearance due largely to the many fracture points involved in the creation of the honeycomb effect.

A still further object of the invention is to provide a method for making the type of cereal described above, which method will be relatively inexpensive and which will lend itself readily to mass production requirements.

Other objects will be in part obvious, and in part pointed out more in detail hereinafter.

The invention accordingly consists in the features of the cereal construction and the method by which the cereal is produced, both of which will be exemplified in the construction hereafter set forth and the scope of the application will be indicated in the appended claims.

In the drawing,

Figure 1 is an elevational view in section of certain extrusion apparatus, somewhat enlarged, taken in the direction of line 1—1 of Figure 3, which apparatus is utilized in the performing of a preferred method for producing my cereal product;

Fig. 2 is an elevational view in section of certain extrusion apparatus, somewhat enlarged, taken in the direction of line 2—2 of Fig. 3;

Fig. 3 is a bottom view corresponding to the apparatus shown in Figs. 1 and 2;

Fig. 4 represents a bottom view similar to Fig. 3 showing a modified arrangement that the invention may assume;

Fig. 5 is a plan view of a single cereal flake or dough wafer before puffing prepared by extrusion through the embodiment of Figs. 1 to 3;

Fig. 6 is a sectional view taken in the direction of line 6—6 of Fig. 5;

Fig. 7 is a plan view showing a group of cereal flakes after puffing;

Fig. 8 is a sectional view taken in the direction of line 8—8 so as to show the internal structure of one of the puffed cereal flakes;

Fig. 9 is a plan view of a cereal flake or dough wafer after puffing prepared by extrusion through the embodiment represented by Fig. 4.

Describing first the apparatus with which the invention may be practiced, reference should be had to Figures 1, 2, 3, and 4 where extrusion apparatus designated generally by the reference numeral 10 has been illustrated as exemplary structure by which the method hereinafter described may be performed. The extrusion apparatus 10 includes a generally cylindrical shell or casing 12 having an upper bore 14 in which is slidably mounted a plunger or piston 16. The plunger or piston 16 is suitably actuated by mechanism not shown, such mechanism being instrumental in urging the piston 16 downwardly against the cooked dough material labelled 18.

The lower end of the cylindrical casing 12 is provided with a bore 20 for the reception of what may generally be termed a plate or divider block 22. The divider block 22 is equipped with a plurality of apertures 24 for the purpose of forming dough filaments 28. By so dividing the dough material a plurality of voids 30 is formed as the dough reforms.

Utilization of the voids 30 is made for the introduction of coloring matter, such as a colored liquid, and in furtherance of this specific aim the divider block 22 is also equipped with a number of food color introducing apertures 32, these apertures being dispersed between the apertures 24. The apertures 32 in the illustrative mechanism are supplied gravitationally with colored liquid by means of a tank or reservoir 34 which has a feeding tube 36 leading into the die apparatus 10, a suitable fitting labelled 38 being shown for the purpose of assuring a fluid tight connection. From Figure 1 it will be seen that the apertures 32 are supplied with the colored liquid by means of the annular groove 40 and connecting passages 42.

For the purpose of retaining the divider block 22 in a fixed operative position, a retaining bushing 44 is provided which has integral therewith a threaded tubular boss 46. The boss 46 abuts against the lower circumferential edge of the divider block 22 and in this way the divider block is held in a fixed relation within the bore 20.

As hereinbefore indicated the function of the divider block 22 is to spread or divide the dough material 18 so that voids 30 are formed and it is into these voids 30 that the food color from the tank 34 is introduced. Accordingly, attention should be directed to Figures 1 and 2 where the columns bearing the reference number 28 are depicted. These columns are incorporated into what may be termed a cylinder of dough material labelled 50, but retain the appearance of a plurality of columns 28 because of the surrounding coloring matter. Due to the dividing action of the apertures 24 the dough material is actually separated as it emerges from the lower end of the divider block 22, but the bore 52 of the tubular boss 46 is of such dimensions that the divided dough material having been compressed and swelled downstream of the divider block is reformed and it is this reformed dough material that has been given the numeral 50. Stated somewhat differently, the cylinder 50 comprises a plurality of parallel columns 28, these columns 28 being distinctly defined by the coloring matter which surrounds the columns 28. In this way the filaments or strands 28 are relatively gently urged into a contiguous or partially fused relationship and do not completely lose their physical identity.

After formation of the cylinder 50 the dough material forming this cylinder is dried sufficiently so that the cylinder may be sliced into a series of thin wafers. One of these relatively thin wafers has been indicated by reference numeral 54 and may be viewed in Figure 5. As seen from this particular figure, longitudinal portions of the filaments or strands 28 are preserved, even after cutting, as evidenced by lines of demarcation designated by the numeral 56 extending completely through the wafer 54. It is these lines 56, or more exactly the short portions, that form what might be termed short columns of dough, these columns having the reference numeral 58. The top surface of the columns 58 can be seen in Figure 5 and from this figure it will be noted that each column is quite regular in a perimetrical direction and closely resembles a continuous hexagonal formation.

After slicing the cylinder 50 into the wafers 54, the wafers are subjected to sufficient radiant heat or other puffing action whereby they are puffed so that each column bulges at its ends to present an over-all bumpy surface, which surface has a honeycomb-like appearance. These bumps or bulges, labelled 60 in Figures 7 and 9, illustrate the flakes obtained by using the perforated dies shown in Figures 3 and 4 respectively and are actually what may be described as small islands separated from each other by intervening grooves or valleys 62 of contrasting color. Consequently the cumulative appearance created by the bulges or mounds 60 and the intervening grooves 62 of contrasting color presents the sought-after honeycomb-like appearance which more specifically in the embodiment of Figure 9 resembles the floral design of a daisy. Stated somewhat differently, the grooves or valleys 62 form a honeycomb-like latticework or pattern of contrasting color to the bulges and swellings 60 therebetween.

Also, from Figure 8 it is to be recognized that the texture of the flake is enhanced by reason of the vesicular internal structure of the flake, this structure resulting in the production of a plurality of small voids or spaces 64. Further, since the flake is weakened at various points throughout, due both to the formation of the bulges 60 and the voids 64, many fracture locations are produced and the friability of the flake is thus increased. As a result, the flake has not only a decidedly unique surface appearance, but it is extremely pleasant to eat because of the many fracture points present in the finished flake product. It is also envisioned that the swellings may be surrounded by contrasting flavor, by itself or in admixture with coloring matter. Thus, it will be recognized that the invention covers marginally modifying the dough material in a honeycomb fashion so that the flakes are divided into uniform areas of various colors and/or flavors.

At this point it should be stressed that the invention is applicable to a variety of cooked cereal doughs and such doughs embrace derivations from wheat, corn, oats, barley, rye, and the like. Further, the doughs may be produced from a single grain or from mixtures thereof and the invention particularly envisages doughs derived from a selected grain together with the addition of a starch for the purpose of improving the puffability of the product. Although these doughs may be cooked in any conventional manner, reference can be had to Collatz Patent 2,162,376, this patent being illustrative of a facile manner in which the cooking of the dough material may be effected. As stated above, although the invention is applicable to cooked doughs in general, it will be described with particular reference to a corn dough. Also it is to be recognized that adjustments in the dough may be desirable especially in the moisture content thereof and in the relative proportions of the ingredients of the dough, too. It is felt, however, that these variations can be readily decided upon from a consideration of the following example and from a consideration of the objects to be achieved.

*Example*

A dough was prepared from the following ingredients:

| | Grams |
|---|---|
| Yellow corn cones | 1135 |
| Sugar | 125 |
| Salt | 25 |
| FD & C yellow dye #5 | 1 |
| Water | 700 |

The above dough ingredients were cooked in a Baker-Perkins double arm jacketed mixer at approximately atmospheric pressure and at a temperature of 212° F. for approximately 1.5 hours with reflux to maintain constant moisture and 0.5 hour with no reflux and vent open to produce a dough having a moisture content of 30 to 35%.

The aforesaid dough was then extruded through the divider block 22 as illustrated in the drawings. Upon emergence from the divider block 22 the dough filaments 28 were surrounded by colored solution composed of the following ingredients:

| Components: | Parts by weight |
|---|---|
| FD & C Red #2 | 0.6 |
| Honey | 33.2 |
| Water | 66.2 |

The resulting cylinder 50 was dried to approximately 8–10% moisture and then sliced into wafers 52. These wafers were then puffed at about 8–10% moisture in a radiant puffing oven to yield the flake product depicted in Figures 7 and 8.

It will be appreciated that when other doughs are utilized the dimensions given above for the extrusion apparatus may be modified to such an extent as to accommodate these other dough materials. Nonetheless from the specific description presented these variations can be arrived at without difficulty. It is also stressed that the exemplified procedure and its associated apparatus are concerned with what may be termed small scale operations. In large scale or mass production situations, provision would be made for the facile introduction of the dough material 18 to the extrusion cylinder 12 by mechanical means and the dough cylinder 50, as it emerges from the bushing 44, would be subjected immediately to the slicing action of a conventional rotating knife without the employment of a drying step, the moisture content of the dough material itself being appropriately adjusted, where necessary, before extrusion for such an accelerated technique.

Accordingly, it will be recognized that the foregoing description is furnished by way of illustration and not of limitation, and it is, therefore, my intention that the invention be limited only by the appended claims or their equivalents wherein I have endeavored to claim broadly all inherent novelty.

Now, therefore, I claim:

1. A method of preparing cereal flakes comprising the steps of extruding a dough material into a bundle of filaments, coating said filaments with coloring matter, exerting pressure laterally against said bundle to cause said filaments to cohere while maintaining their individual identities, slicing said bundle transversely into relatively thin wafers, and heating said wafers sufficiently to cause facial portions thereof to bulge outwardly, the individual facial portions being outlined by a contrasting color.

2. A method of preparing cereal flakes comprising the steps of extruding a dough material to produce a plurality of filaments, coating said filaments with contrasting coloring matter, at least partially coalescing said filaments together with sufficient pressure to form a bundle of said filaments while maintaining their individual identities, slicing said strip transversely into relatively thin wafers, and puffing said wafers to cause facial portions thereof to bulge outwardly, the individual facial portions being outlined by a contrasting color.

3. A method of preparing cereal flakes comprising the steps of producing a dough having sufficient moisture content therein for extrusion, extruding the dough to produce a plurality of filaments, coating said filaments with coloring matter, confining longitudinal portions of said filaments after extrusion so that they are at least partially coalesced, drying said filaments sufficiently to permit slicing of the filaments into relatively thin wafers without substantial loss of filamentary identity, slicing said filaments transversely into said wafers, and puffing said wafers to cause facial portions thereof to bulge outwardly, the individual facial portions being outlined by a contrasting color.

4. A method of preparing cereal flakes comprising the steps of advancing a plurality of dough filaments having a transverse separation in a plane generally normal to the direction of advancement, introducing a contrasting medium between said filaments in the plane of separation, urging said filaments together after introduction of said medium so as to produce a coalesced column, slicing said column transversely into relatively thin wafers having dough sections outlined by said contrasting medium, and heating said wafers so as to produce relatively crisp cereal flakes.

5. A cereal product in the form of a relatively thin flake, said flake comprising short segments of extruded dough filaments surrounded by contrasting colored material, said filament segments being situated in a side by side relationship and adhered to each other along their sides to form said flakes, the end faces of said segments lying generally in a plane, the end faces of said segments being puffed outwardly as compared with the areas defining the contact between the segments, the contact between said segments being of a contrasting color.

References Cited in the file of this patent

UNITED STATES PATENTS

| | | |
|---|---|---|
| 740,858 | Hosmer | Oct. 6, 1903 |
| 1,020,481 | De Bevoise | Mar. 19, 1912 |
| 2,284,651 | Gundlach et al. | June 2, 1942 |
| 2,338,588 | Kishlar et al. | Jan. 4, 1944 |
| 2,339,419 | McKay | Jan. 18, 1944 |
| 2,344,901 | Routh | Mar. 21, 1944 |